(12) United States Patent
Kim

(10) Patent No.: US 11,630,478 B1
(45) Date of Patent: Apr. 18, 2023

(54) FOLDABLE PEDAL APPARATUS FOR VEHICLE

(71) Applicants: Hyundai Motor Company, Seoul (KR); Kia Corporation, Seoul (KR)

(72) Inventor: Eun Sik Kim, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/728,406

(22) Filed: Apr. 25, 2022

(30) Foreign Application Priority Data

Nov. 18, 2021 (KR) .................... 10-2021-0159437

(51) Int. Cl.
| | | |
|---|---|---|
| G05G 1/30 | (2008.04) | |
| G05G 5/00 | (2006.01) | |
| B60T 7/04 | (2006.01) | |
| G05G 1/40 | (2008.04) | |
| B60T 7/06 | (2006.01) | |
| B60K 26/02 | (2006.01) | |

(52) U.S. Cl.
CPC .............. G05G 5/005 (2013.01); B60T 7/042 (2013.01); B60T 7/06 (2013.01); G05G 1/40 (2013.01); B60K 2026/026 (2013.01)

(58) Field of Classification Search
CPC .. G05G 1/30; G05G 1/32; G05G 1/36; G05G 1/40; G05G 1/405; G05G 5/005; G05G 5/28; B60K 26/02; B60K 2026/024; B60K 2026/026; B60T 7/04; B60T 7/042; B60T 7/06; B60T 7/065; B60R 21/09
See application file for complete search history.

(56) References Cited

U.S. PATENT DOCUMENTS

| | | | | |
|---|---|---|---|---|
| 11,249,506 | B1 * | 2/2022 | Kim .......................... | G05G 5/28 |
| 11,312,236 | B1 * | 4/2022 | Kim .......................... | B60T 7/065 |
| 11,458,838 | B1 * | 10/2022 | Kim .......................... | B60T 7/06 |
| 11,465,498 | B1 * | 10/2022 | Kim .......................... | B60T 7/06 |
| 2022/0001843 | A1 * | 1/2022 | Michael ................... | G05G 1/60 |

FOREIGN PATENT DOCUMENTS

| | | |
|---|---|---|
| DE | 102017215904 A1 * | 3/2019 |
| KR | 10-2017-0137427 A | 12/2017 |
| WO | WO-2021182563 A1 * | 9/2021 |

OTHER PUBLICATIONS

Machine Translation of KR 10-2017-137427.*
Machine Translation of WO 2021/182563.*
Machine Translation of DE 10 2017 215 904.*

* cited by examiner

*Primary Examiner* — Richard W Ridley
*Assistant Examiner* — Brian J McGovern
(74) *Attorney, Agent, or Firm* — Morgan, Lewis & Bockius LLP

(57) ABSTRACT

The present disclosure discloses a foldable pedal apparatus for a vehicle in which a pedal pad 210 protrudes to be exposed to the interior of a vehicle and pop up toward a driver in a manual driving mode in which the driver is actively involved in driving, in which the pedal pad 210 is inserted into a footrest panel 10 such that exposure toward the driver is blocked in a hide state in an autonomous driving mode, and which may generate a signal relating to a pedal function by operating the pedal pad 210 by pressure through the pressure-operated pedal assembly 200 in a pop-up state.

16 Claims, 12 Drawing Sheets

FOLDABLE PEDAL APPARATUS FOR VEHICLE

CROSS REFERENCE TO RELATED APPLICATION

The present application claims priority to Korean Patent Application No. 10-2021-0159437, filed Nov. 18, 2021, the entire contents of which is incorporated herein for all purposes by this reference.

TECHNICAL FIELD

The present disclosure relates to a foldable pedal apparatus for a vehicle in which a pedal pad protrudes to be exposed toward a driver so that the pedal pad may be operated by the driver in a manual driving mode in which the driver is actively involved in driving, and in which the pedal pad is hidden such that exposure toward the driver is blocked so that the pedal pad may not be operated by the driver in an autonomous driving mode.

BACKGROUND

An autonomous driving vehicle is a smart vehicle incorporating autonomous driving technology that allows the vehicle to reach a destination on its own without active operations of the steering wheel, accelerator pedal, and brake by a driver and has been rapidly developed recently.

When the autonomous driving is universally realized, a manual driving mode in which the driver is actively involved in driving or an autonomous driving mode in which the vehicle drives to a destination on its own without active involvement in driving by the driver may be selected.

Since the driver needs to rest comfortably with his feet stretched in the autonomous driving mode, a disadvantage is that pedals (accelerator pedal, brake pedal) positioned in a space below the driver's seat interfere with the driver's rest if exposed to the interior in the space below the driver's seat.

Further, if the driver operates pedals (accelerator pedal, brake pedal) of the vehicle in an autonomous driving mode when the driver is not to operate the pedals, the vehicle control apparatus determines that the driver wants to terminate the autonomous driving and be actively involved in driving and terminates the control for autonomous driving.

However, since the vehicle pedals are installed to be exposed in the space below the driver's seat, there is a concern that the driver may unconsciously operate the pedals in the autonomous driving mode (a case of a faulty pedal operation). In such a case, there is a risk of accident depending on the situation on the road, distance between vehicles, or the like.

Accordingly, there is a need for technological development for a pedal apparatus in which the pedal pad protrudes to be exposed toward a driver so that the pedal pad may be operated by the driver in the manual driving mode in which the driver is actively involved in driving, and in which exposure of the pedal pad is blocked so that the pedal pad may not be operated by the driver in the autonomous driving mode for the comforting rest of the driver and safety like prevention of a faulty operation.

The matters described above as a technical background are intended only for a better understanding of the background of the present disclosure and are not to be taken as acknowledgment that they pertain to the conventional art already known to those skilled in the art.

SUMMARY

An object of the present disclosure is to provide a foldable pedal apparatus in which a pedal pad protrudes to be exposed (pop up) toward a driver so that the pedal pad may be operated by the driver in a manual driving mode in which the driver is actively involved in driving, and the pedal pad is hidden such that exposure toward the driver is blocked so that the pedal pad may not be operated by the driver in an autonomous driving mode, thereby allowing a comforting rest of the driver in the autonomous driving mode and improving safety by blocking a faulty operation of the pedal in the autonomous driving mode.

Another object of the present disclosure is to provide a foldable pedal apparatus that allows the cost reduction by decreasing the number of parts and the downsizing through a compact configuration in the configuration of the pressure-operated pedal apparatus.

In order to achieve the objects described above, the foldable pedal apparatus according to an embodiment of the present disclosure includes a pedal housing rotatably installed in the footrest panel and a pressure-operated pedal assembly provided in the pedal housing and operated by pressure to generate a signal relating to a pedal function during the operation by the driver, wherein, when the pressure-operated pedal assembly is inserted into the footrest panel by a rotation of the pedal housing, the pressure-operated pedal assembly may not be operated by the driver in a hide state, and when the pressure-operated pedal assembly protrudes from the footrest panel, the pressure-operate pedal assembly may be operated by the driver in a pop-up state.

A rotary motor fixed to the footrest panel and coupled to the pedal housing to rotate the pedal housing during operation; and a rotation center pin connecting the footrest panel to the pedal housing to serve as a rotation center of the pedal housing are further included.

A rotation axis connecting the rotary motor and the rotation center pin is positioned inside the footrest panel.

A stopper protrusion is formed to protrude outward from the pedal housing, and the position of hide state and the position of pop-up state are determined by pedal housing being restrained from rotating when the stopper protrusion comes into contact with an inner surface of the footrest panel during the rotation of the pedal housing.

A pedal pad constituting the pressure-operated pedal assembly protrudes from one surface of the pedal housing; a housing cover is coupled to the other surface of the pedal housing; and when the pedal pad is inserted into the footrest panel and the housing cover is exposed to the interior of the vehicle by the rotation of the pedal housing, the pedal pad may not be operated by the drive in the hide state, while, when the housing cover is inserted into the footrest panel and the pedal pad is exposed to the interior of the vehicle, the pedal pad may be operated by the driver in the pop-up state.

The housing cover is formed in a flat plate; and the flat plate-shaped housing cover forms the same plane as the footrest panel with no height difference when the housing cover is exposed to the interior of the vehicle in the hide state.

The pressure-operated pedal assembly includes two assemblies having the same configurations to be spaced apart from each other in the pedal housing; and one of the two pressure-operated pedal assemblies is an accelerator pedal device generating a signal relating to the acceleration during the operation by the driver and the other is a brake pedal device generating a signal relating to the braking.

The pressure-operated pedal assembly includes a pedal pad protruding from one surface of the pedal housing to be operated by a driver; a pad rubber coupled to the pedal pad; a pressure sensor fixed to the pedal housing to generate an electrical signal upon coming into contact with the pad rubber by the operation of the pedal pad; and a PCB fixed to the pedal housing to receive a signal from the pressure sensor and generate a signal relating to a pedal function.

The pressure-operated pedal assembly further includes a support bulkhead fixed to the pedal housing to support the PCB; and a return spring installed to be supported at either end by the pedal pad and the support bulkhead through the pad rubber, the pressure sensor, and the PCB.

The pressure-operated pedal assembly further includes a pedal guide coupled to the pedal pad and wrapped around the perimeter of the pad rubber to maintain a shape of the pad rubber.

An air gap of a predetermined width is provided between the rubber pad and the pressure sensor in the state in which the driver does not operate the pedal pad.

The pressure-operated pedal assembly includes two assemblies of which one is used as an accelerator pedal device and the other is used as a brake pedal device; and the pedal pad used as the brake pedal device is formed to be larger than the pedal pad used as the accelerator pedal device.

The surface of the pedal pad is formed in an arc shape; and the surface arc of the pedal pad is formed to have a radius the same as, or less than, the radius of the rotational arc of the pedal housing.

The pad rubber includes an overlap portion overlapping the pad guide and a non-overlap portion not overlapping the pad guide in the operation direction of the pedal pad; and the sensitivity of the pedal pad may be tuned by adjusting the ratio between the overlap portion and non-overlap portion.

In the foldable pedal apparatus according to the present disclosure, the pedal pad pops up to protrude to the interior of the vehicle and be exposed toward the driver so that the pedal pad may be operated by the driver in the manual driving mode in which the driver is actively involved in driving, and the pedal pad is inserted into the footrest panel such that exposure toward the driver is blocked so that the pedal pad may not be operated by the driver in the hide state in the autonomous driving mode in which the driver is not actively involved in driving. And there is the effect that the driver may take a rest in comfort in the autonomous driving mode, and further, that safety may be improved by blocking a faulty operation of the pedal in the autonomous driving mode.

Further, the foldable pedal apparatus according to the present disclosure generates a signal relating to a pedal function by operating the pedal pad by pressure through the pressure-operated pedal assembly in the pop-up state, and there is the effect of cost reduction by reducing the number of parts and downsizing through the compact configuration.

Further, in the foldable pedal apparatus according to the present disclosure, a simple configuration of the pressure-operated pedal assembly and a rotating structure of the pedal housing provided with the pedal pad allow pop-up operation and hide operation so that the interior of the vehicle may be maximally designed by minimizing the space needed for the pop-up operation and that, in particular, the high-tech image may be maximized by the configuration in which the pedal housing rotates and the pedal pad pops up through a small panel hole.

DETAILED DESCRIPTION OF THE DISCLOSURE

Figure 1:
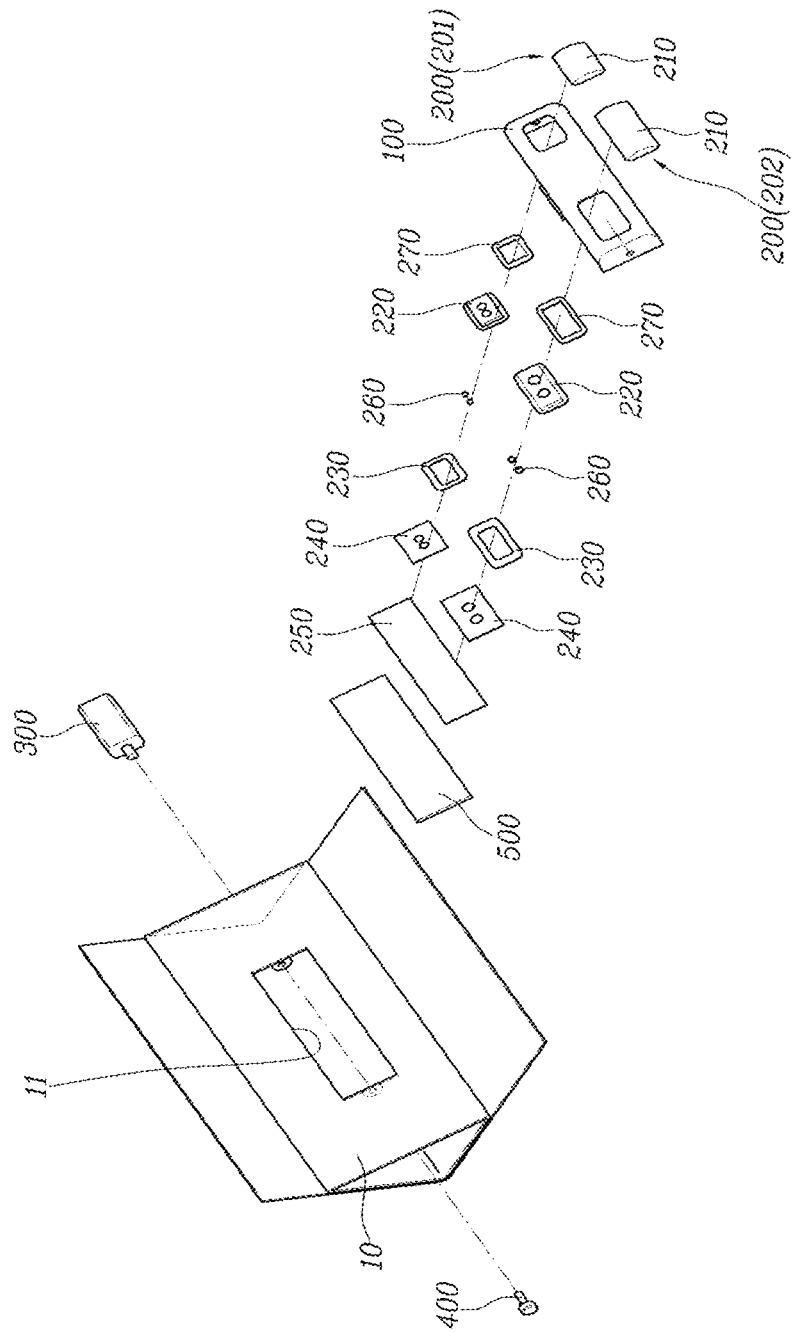
FIG. 1 is an exploded perspective view of a foldable pedal apparatus according to the present disclosure.

Specific structural or functional descriptions of the embodiments of the present disclosure disclosed in the present specification or application existed by way of examples only for the purpose of describing the embodiments according to the present disclosure, and the embodiments according to the present disclosure may be implemented in various forms and are not to be construed as being limited to the embodiments described in the present specification or application.

Since the embodiment of the present disclosure may be modified in various ways and have various forms, specific embodiments will be illustrated in the drawings and described in the present specification or application. However, this is not intended to limit the embodiments according to the concept of the present disclosure to the specific forms and is to be construed as including all modifications, equivalents, and substitutes included in the spirit and technical scope of the present disclosure.

Terms such as first and/or second may be used to describe various components, but the components are not to be limited by the terms. The terms only serve the purpose of distinguishing one component from other components. For example, the first component may be referred to as the second component, and similarly, the second component may also be referred to as the first component without deviating from the scope of the right according to the concept of the present disclosure.

When a component is referred to as being "connected" or "coupled" to another component, it may be directly connected or coupled to the another component, but it is to be understood that other components may exist in between. On the other hand, when a component is referred to as being "directly connected" or "directly coupled" to another component, it is to be understood that there are no intervening components present. Other expressions describing the relationship between components such as "between" and "just between", or "adjacent to" and "directly adjacent to" are to be interpreted in the same manner.

The terms used herein are used for the purpose of describing particular embodiments only and are not intended to limit the disclosure. Singular expressions include plural expressions unless the context explicitly indicates otherwise. In the present specification, terms such as "comprise" or "have" are intended to designate the presence of implemented features, numbers, steps, operations, components, parts, or combinations thereof and are not to be understood to preclude the presence or additional possibilities of one or more of other features, numbers, steps, operations, components, parts or combinations thereof in advance.

Unless otherwise defined, all terms used herein, including technical or scientific terms, have the same meanings as are generally understood by those with common knowledge in the art to which the present disclosure pertains. It will be further understood that terms, such as those defined in commonly used dictionaries, is to be interpreted as having a meaning that is consistent with their meaning in the context of the present specification, and will not be interpreted in an idealized or overly formal sense unless expressly so defined herein.

A control unit (controller) according to an embodiment of the present disclosure may be implemented through a processor (not shown) configured to perform operations to be described below using an algorithm configured to control the operations of various components of a vehicle or a nonvolatile memory (not shown) configured to store data relating to software commands for reproducing the algorithm and the data stored in the memory. Here, the memory and the processor may be implemented as individual chips. Alternatively, the memory and the processor may be implemented as a single integrated chip. The processor may take the form of one or more processors.

In the following, a foldable pedal apparatus for a vehicle according to a preferable embodiment of the present disclosure will be described with reference to the accompanying drawings.

The foldable pedal apparatus according to the present disclosure includes a pedal housing 100 rotatably installed in a footrest panel 10 positioned in a space below a driver's seat; and a pressure-operated pedal assembly 200 provided in the pedal housing 100 and operated by pressure to generate a signal relating to a pedal function during the operation by a driver.

Figure 2:
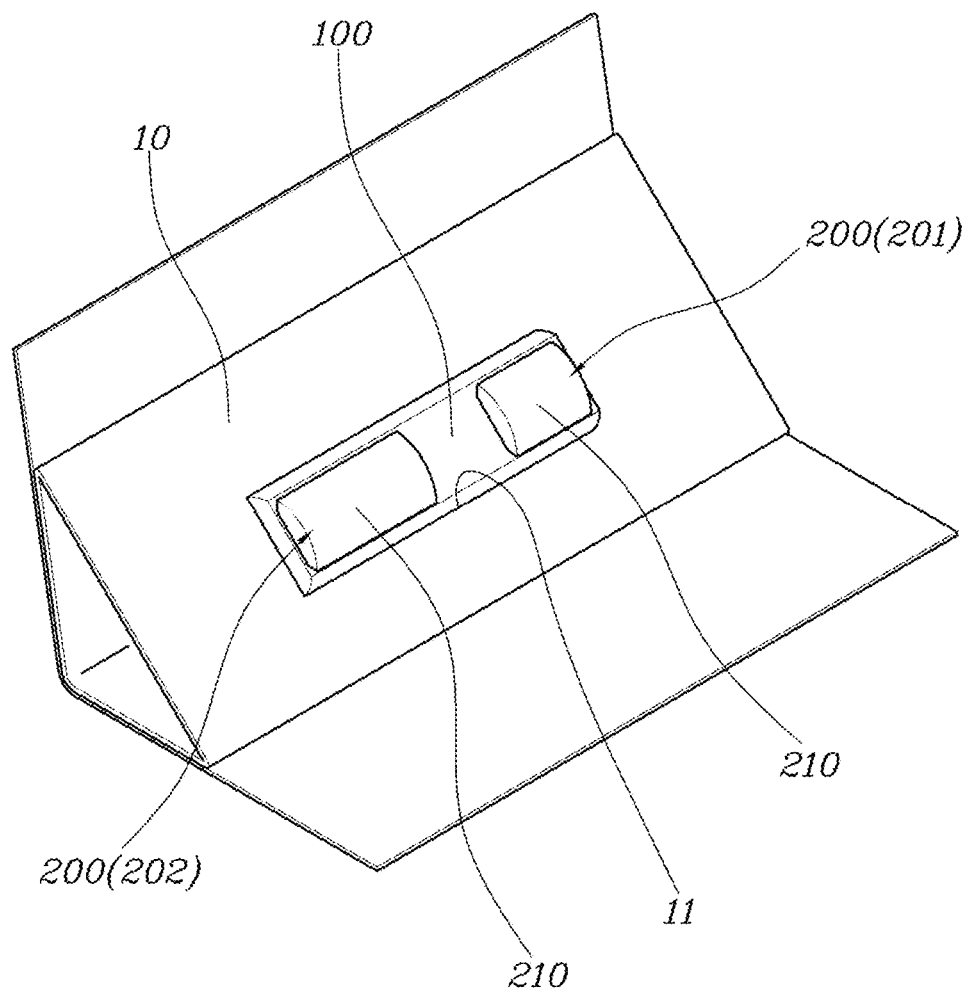
FIG. 2 is a view showing an assembled state of the foldable pedal apparatus in FIG. 1 with pedal pads exposed to an interior of a vehicle in a pop-up state.

When the pressure-operated pedal assembly 200 is inserted into the footrest panel 10 by the rotation of the pedal housing 100 (refer to FIGS. 4 and 5), the pressure-operated pedal assembly 200 may not be operated by the driver in a hide state, and when the pressure-operated pedal assembly 200 protrudes from the footrest panel 10 by the rotation of the pedal housing 100 (refer to FIGS. 2, 3, and 6), the pressure-operated pedal assembly 200 may be operated by the driver.

A panel hole 11 is formed in the footrest panel 10, and the pedal housing 100 is rotatably installed through the panel hole 11.

The foldable pedal apparatus according to the present disclosure further includes a rotary motor 300 fixed to the footrest panel 10 and coupled to one side of the pedal housing 100 to rotate the pedal housing 100 during an operation; and a rotation center pin 400 connecting the footrest panel 10 and pedal housing 100 to serve as a rotation center of the pedal housing 100.

A motor shaft of the rotary motor 300 is coupled to one side of the pedal housing 100 so that the motor shaft and the pedal housing 100 rotate integrally, and the rotation center pin 400 serves as the center of rotation during the rotation of the pedal housing 100.

An axis connecting the rotary motor 300 and the center of the rotation center pint 400 becomes a rotation axis L1 of the pedal housing 100, the rotation axis L1 of the pedal housing 100 is set to be positioned inside the footrest panel 10, and thus, the pressure-operated pedal assembly 200 protrudes at the time of popping-up, thereby creating a condition favorable for the operation of the pedal apparatus.

A stopper protrusion 110 is formed to protrude outward from the pedal housing 100.

Figure 3:
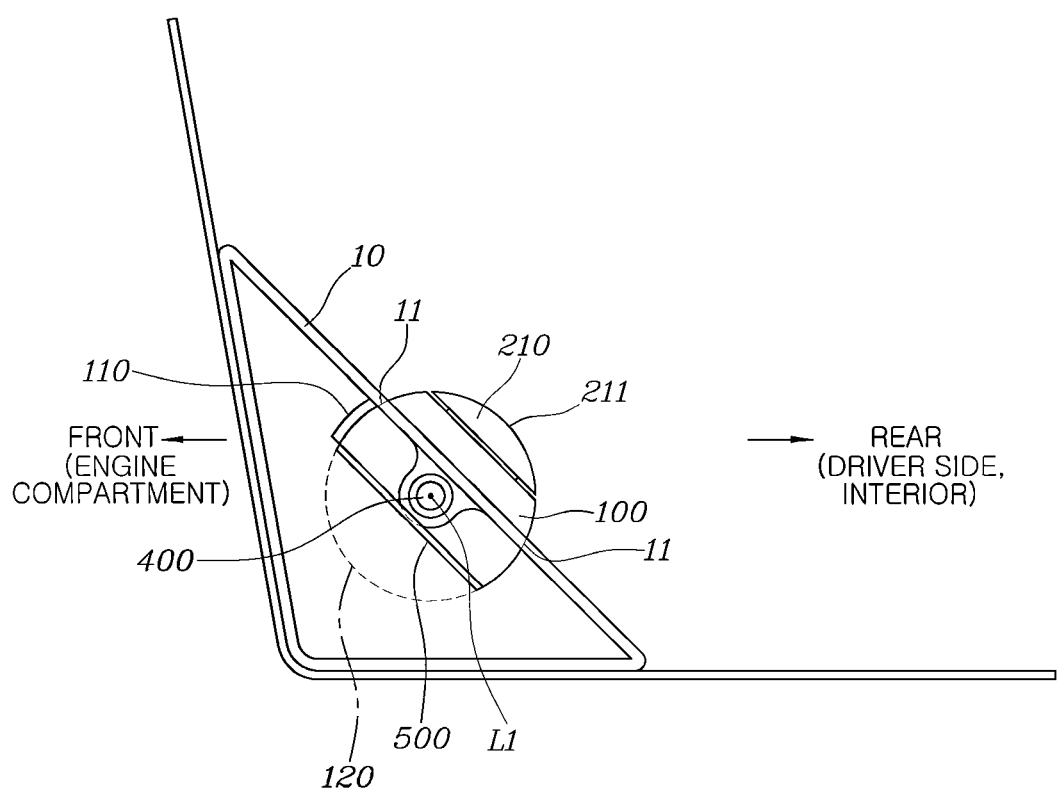
FIG. 3 is a side view of the foldable pedal apparatus in FIG. 2.
Figure 4:
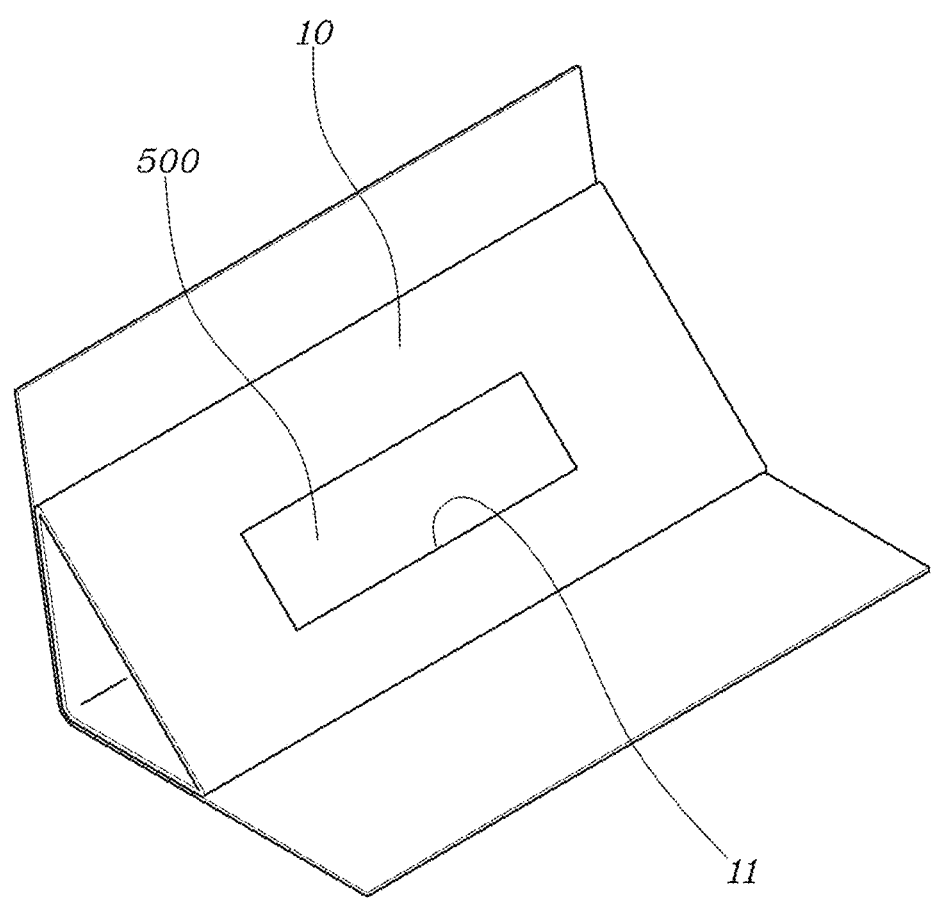
FIG. 4 is a view showing pedal pads inserted into a footrest panel in a hide state.

The stopper protrusion 110 is formed to protrude upward in the center of the upper surface of the pedal housing 100 in a pop-up state as shown in FIG. 3.

The stopper protrusion 110 does not pass through the panel hole 11 formed in the footrest panel 10 when the pedal housing 100 rotates with respect to the footrest panel 10 by the power of the rotary motor 300.

Accordingly, the hide state position and the pop-up state position of the foldable pedal apparatus according to the present disclosure are determined by the pedal housing 100 being restrained from rotating when the stopper protrusion 110 comes into contact with an inner surface of the footrest panel 10 during the rotation of the pedal housing 100.

That is, as shown in FIG. 3, when the stopper protrusion 110 comes into contact with the inner surface of the footrest panel 10 on the upper side of the panel hole 11 by the rotation of the pedal housing 100, the pedal pad 210 constituting the pressure-operated pedal assembly 200 protrudes toward the interior of the vehicle where the driver is present.

Figure 5:
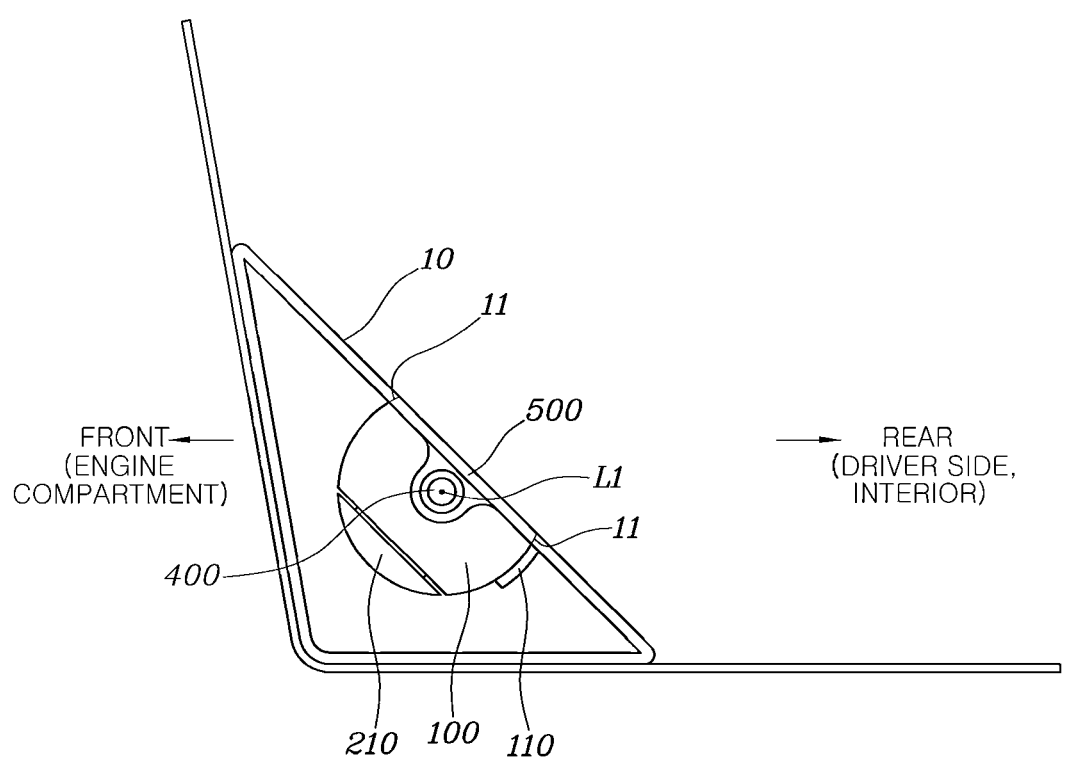
FIG. 5 is a side view of the foldable pedal apparatus in FIG. 4.
Figure 6:
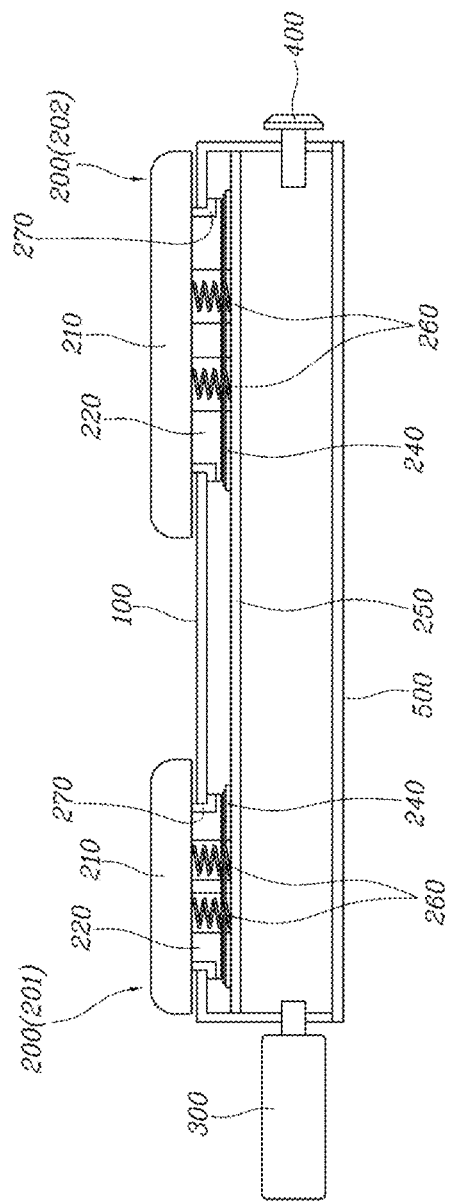
FIG. 6 is a longitudinal view of a foldable pedal device for a vehicle according to the present disclosure.
Figure 7:
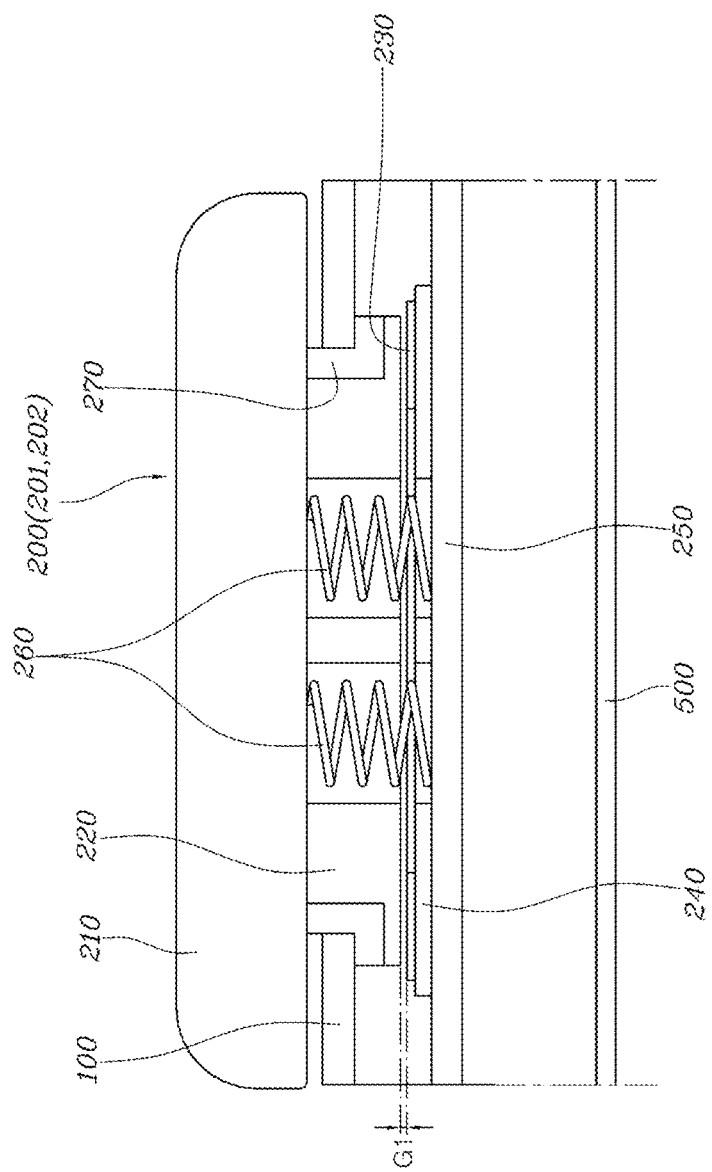
FIG. 7 is a view for describing a pressure-operated pedal assembly according to the present disclosure.

In contrast, as shown in FIG. 5, when the stopper protrusion 110 comes into contact with the inner surface of the footrest panel 10 on the lower side of the panel hole 11 by the rotation of the pedal housing 100, the pedal pad 210 constituting the pressure-operated pedal assembly 200 is inserted into the footrest panel 10 in the hide state.

The pedal pad 210 constituting the pressure-operated pedal assembly 200 protrudes from one surface of the pedal housing 100 and a housing cover 500 is coupled to the other surface of the pedal housing 100.

When the pedal pan 210 provided in the pedal housing 100 is inserted into the footrest panel 10 and the housing cover 500 is exposed to the interior of the vehicle by the rotation of the pedal housing 100 during the operation of the rotary motor 300 (refer to FIGS. 4 and 5), the pedal pad 210 may not be operated by the driver in the hide state, and when the housing cover 500 is inserted into the footrest panel 10 and the pedal pad 210 provided in the pedal housing 100 is exposed to the interior of the vehicle by the rotation of the pedal housing 100 (refer to FIGS. 2, 3, and 6), the pedal pad 210 may be operated by the driver in the pop-up state.

The housing cover 500 of the present disclosure is formed in a flat plate, and the housing cover 500 forms the same plane as the footrest panel 10 with no height difference when the housing cover 500 is exposed to the interior of the vehicle in the hide state as shown in FIG. 5.

That is, the housing cover 500 is a component coupled to the rear surface of the pedal housing 100 to form a design surface, and the housing cover 500 is formed in the same plane as the footrest panel 10 with no height difference in the hide state as shown in FIG. 5, thereby improving appearance.

If the distances from the rotation axis L1 to the footrest panel 10 and the housing cover 500 are set to be the same in the pop-up state shown in FIG. 3, the housing cover 500 forms the same plane as the footrest panel 10 with no height difference in the hide state shown in FIG. 5, thereby improving appearance.

The pressure-operated pedal assembly 200 according to the present disclosure includes two assemblies having the same configurations to be spaced apart from each other in the pedal housing 100. One of the two pressure-operated pedal assemblies 200 is an accelerator pedal device 201 generating a signal relating to the acceleration during the operation by the driver and the other is a brake pedal device 202 generating a signal relating to the braking.

That is, in an embodiment of the present disclosure, the pressure-operated pedal assembly 200 positioned on the right side of the pedal housing 100 is the accelerator pedal device 201 and the pressure-operated pedal assembly 200 positioned on the left side is the brake pedal device 202.

The pressure-operated pedal assembly 200 protrudes from one surface of the pedal housing 100 and includes a pedal pad 210 operated by the driver; a pad rubber 220 coupled to the pedal pad 210; a pressure sensor 230 fixed to the pedal housing 100 to generate an electrical signal upon coming into contact with the pad rubber 220 by the operation of the pedal pad 210; and a printed circuit board (PCB) 240 fixed to the pedal housing 100 to receive a signal of the pressure sensor 230 and generate a signal relating to the pedal function.

The pressure-operated pedal assembly 200 further includes a support bulkhead 250 fixed to the pedal housing 100 to support the PCB 240; and a return spring 260 installed to be supported at either end by the pedal pad 210 and the support bulkhead 250 through the pad rubber 220, pressure sensor 230, and PCB 240; and a pad guide 270 coupled to the pedal pad 210 and wrapped around the perimeter of the pad rubber 220 to maintain a shape of the pad rubber 220.

As described above, the pressure-operated pedal assembly 200 includes two assemblies having the same configurations, and one of the two is the accelerator pedal device 201 while the other is the brake pedal device 202.

Accordingly, the accelerator pedal device 201 and the brake pedal device 202 respectively include a pedal pad 210, a pad rubber 220, a pressure sensor 230, a PCB 240, a support bulkhead 250, a return spring 260, and a pad guide 270, and one support bulkhead 250 is provided for sharing.

Here, it is preferable that the pedal pad 210 used as the brake pedal device 202 be formed to be larger than the pedal pad 210 used as the accelerator pedal device 201. This allows the driver to operate the brake pedal more easily than the accelerator pedal, and the prevention of faulty operation and safety regarding pedal operations may be further improved.

The PCB 240 of the accelerator pedal device 201 receives an electrical signal of the pressure sensor 230 to generate a signal relating to the acceleration, and the PCB 240 of the brake pedal device 202 receives an electrical signal of the pressure sensor 230 to generate a signal relating to the braking.

The return spring 260 serves to return the pedal pad 210 by spring force, accumulates elastic force while being compressed when the pedal pad 210 moves toward the housing cover 500 by the operation of the driver, and is decompressed to return the pedal pad 210 to its initial position when the operating force of the driver is released from the pedal pad 210.

The return spring 260 includes a compression coil spring and includes a fail-safe function whereby the accelerator pedal device 201 and brake pedal device are respectively provided 202 with a pair of springs so that even if either one is damaged, the other one operates normally.

Further, the pair of return springs 260 may be configured to have different spring forces so that the pedal effort may be tuned and, in particular, subtle vibrations of the pedal pad 210 may be restrained through the tuning of the spring force of the return spring 260.

A hole passing through the pad rubber 220, the pressure sensor 230, and the PCB 240 is formed for the installation of the return spring 260, and the return spring 260 is installed through the hole such that either end of the return spring 260 is respectively supported by the pedal pad 210 and the support bulkhead 250.

It is preferable that the hole passing through the pad rubber 220, the pressure sensor 230, and the PCB 240 be formed to be large enough not to interfere with the return spring 260.

Figure 8:
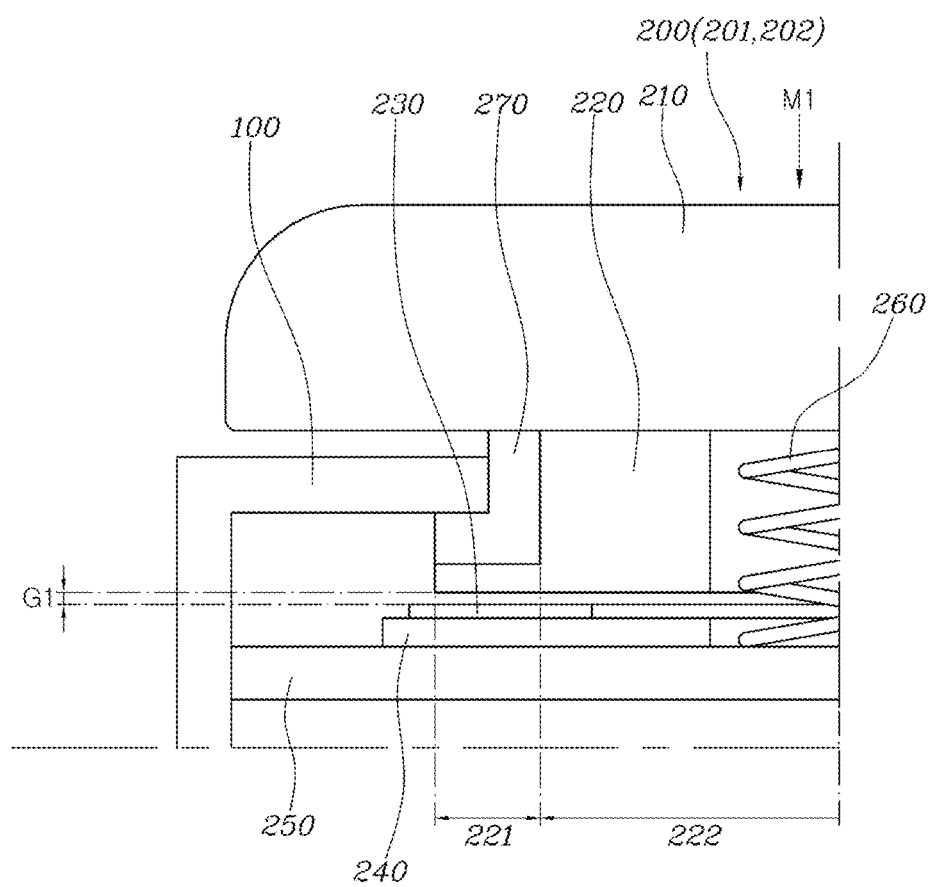
FIG. 8 is an enlarged view showing a part where a pad guide is located in FIG. 7.
Figure 9:
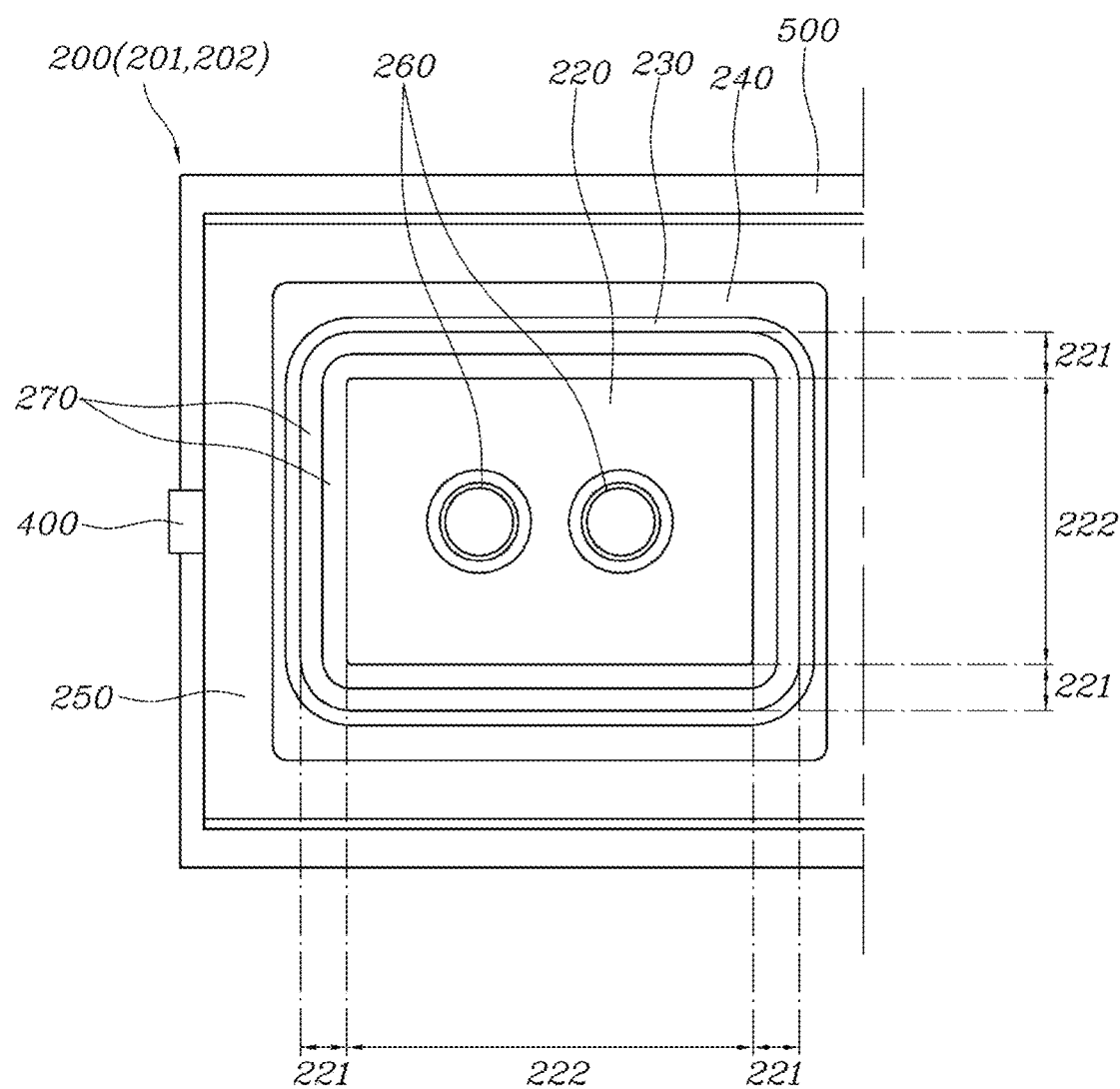
FIG. 9 is a plan view showing the state in FIG. 7 with the pedal pad removed.
Figure 10:
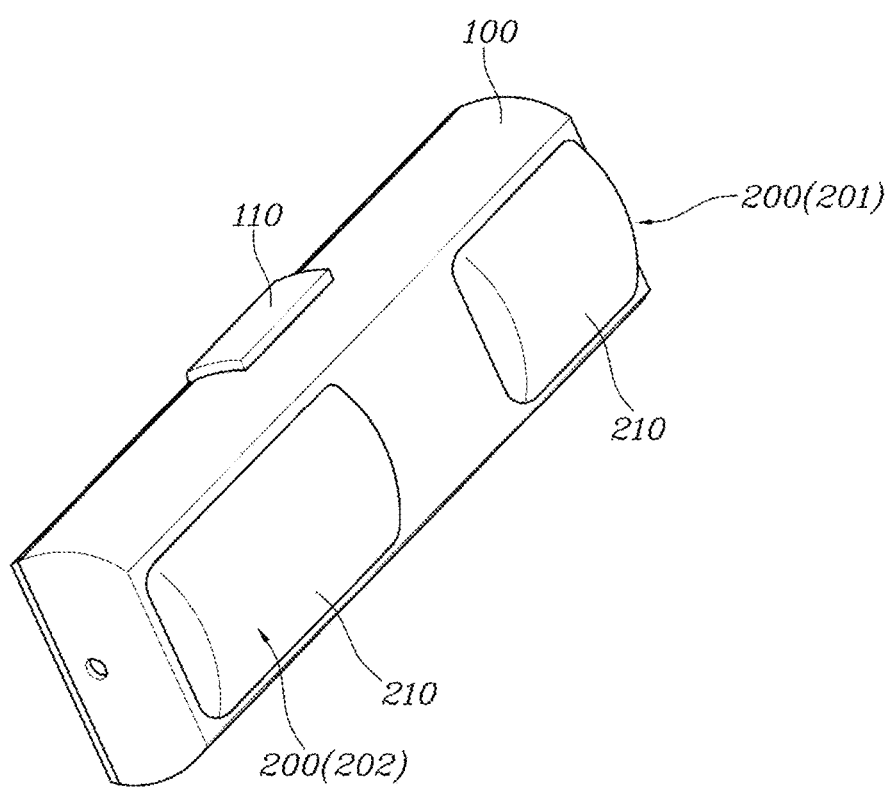
FIG. 10 is a view showing a pedal housing with a stopper protrusion according to the present disclosure.
Figure 11:
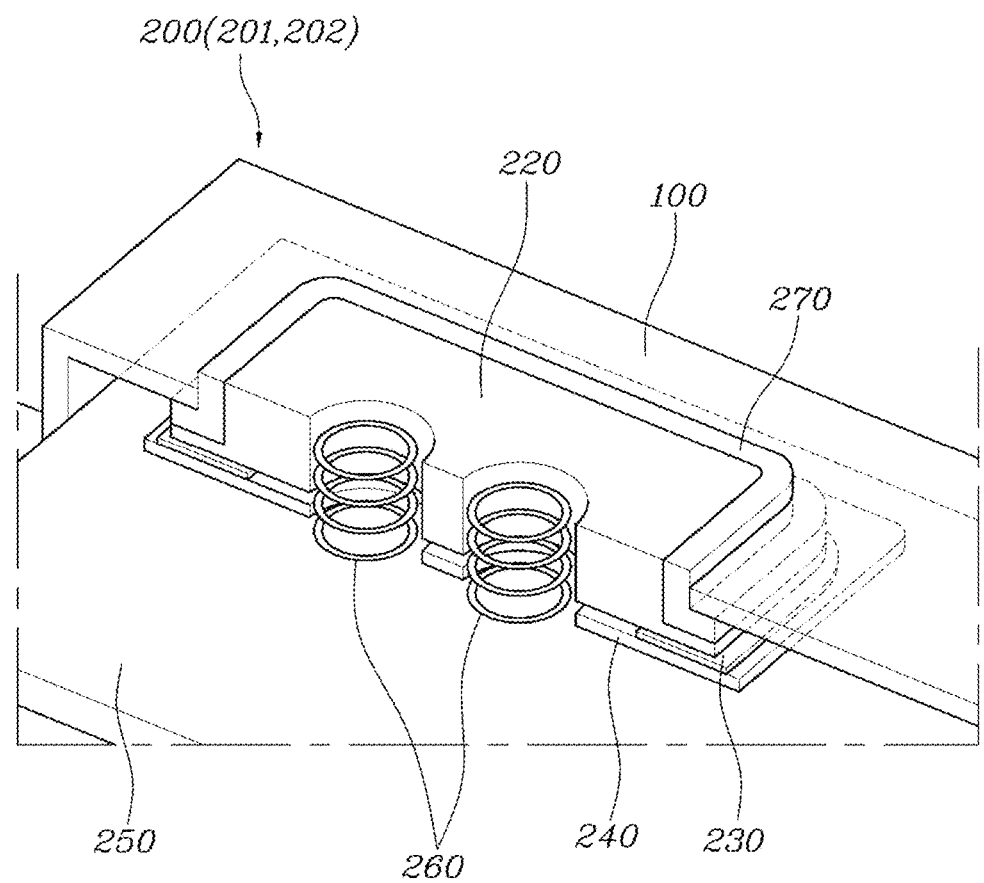
FIG. 11 is a partial cutaway view of a pressure-operated pedal assembly according to the present disclosure.

The foldable pedal apparatus according to the present disclosure is provided with an air gap G1 of a predetermined width between the pad rubber 220 and the pressure sensor 230 in the state where the driver does not operate the pedal pad 210 as shown in FIG. 8.

An embodiment according to the present disclosure is provided with a pressure-operated pedal assembly 200. If an air gap G1 of a predetermined width is placed between the pad rubber 220 and the pressure sensor 230 in the configuration of the pressure-operated pedal apparatus having a very short stroke of the pedal pad 210, the driver may experience a sense of operating the pedal pad 210 given through the spring force of the return spring 260 during the operation of the pedal pad 210.

The pedal housing 100 according to the present disclosure rotates with respect to the footrest panel 10 by the power of the rotary motor 300 and the surface of the pedal pad 210 is formed in an arc 211. It is preferable that the surface arc 211 of the pedal pad 210 be formed to have a radius the same as, or less than, the radius of the rotational arc 120 of the pedal housing 100.

If the surface arc 211 of the pedal pad 210 is greater than the rotational arc 120 of the pedal housing 100, the pedal pad 210 may not pass through the panel hole 11 of the footrest panel 10 when the pedal housing 100 rotates, and in this case, the hide motion and the pop-up motion of the pedal apparatus according to the present disclosure are impossible. To prevent this, it is preferable that the surface arc 211 of the pedal pad 210 be formed to have a radius the same as, or less than, the radius of the rotational arc 120 of the pedal housing 100.

As shown in FIG. 8, the pad rubber 220 according to the present disclosure includes an overlap portion 221 overlapping the pad guide 270 and a non-overlap portion 222 not overlapping the pad guide 270 in the operation direction Ml of the pedal pad 210, and an operating sensitivity of the pedal pad may be tuned by adjusting the ratio between the overlap portion 221 and non-overlap portion 222.

That is, the overlap portion 221 overlapping the pad guide 270 in the pad rubber 220 may implement a hard feeling because of a thin rubber layer, and the non-overlap portion 222 not overlapping the pad guide 270 in the pad rubber 220 is the region in which only rubber is compressed during the operation of the pedal pad 210 and may implement a relatively softer feeling than the overlap portion 221.

Accordingly, an embodiment of the present disclosure may implement the optimal operating force of the pedal pad 210 by adjusting the ratio between the overlap portion 221 and non-overlap portion 222 of the pad rubber 220. For example, a harder feeling may be implemented if the ratio of the overlap portion 221 is increased while a softer feeling may be implemented if the ratio of the non-overlap portion 222 is increased.

Figure 12:
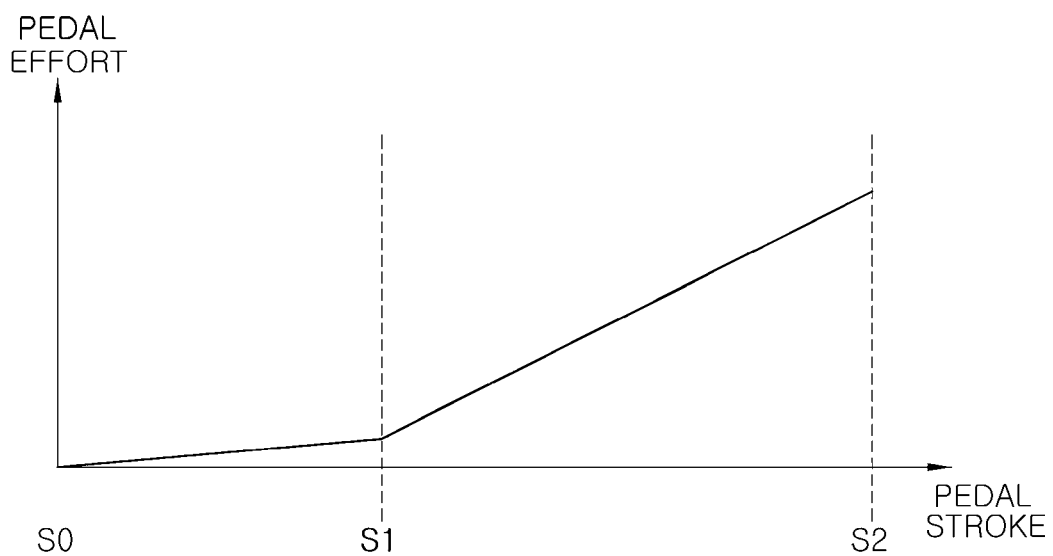
FIG. 12 is a graph for describing a relationship between a pedal stroke and a pedal effort during the operation of a foldable pedal apparatus according to the present disclosure.

FIG. 12 is a graph showing a relationship between the pedal stroke and the pedal effort during the operation of the foldable pedal apparatus according to the present disclosure.

Position S0 denotes a situation where the driver does not operate the pedal pad 210, and, at this time, the air gap G1 between the pad rubber 220 and the pressure sensor 230 remains at its maximum of the initial state.

In the section from S0 to S1 in which the driver operates the pedal pad 210 by stepping thereon, the return spring 260 is gradually compressed to generate the pedal effort by the spring force and the air gap G1 is gradually reduced.

At point S1, the air gap G1 is zero. The pad rubber 220 comes into contact with the pressure sensor 230 at this time and the pressure sensor 230 generates an electrical signal from this time onward.

In the section from S1 to S2, continued operation of the pedal pad 210 while the air gap G1 remains zero keeps compressing the return spring 260 and the pad rubber 220 is also compressed at the same time.

In the section from S1 to S2, both the spring force of the return spring 260 and the pedal effort by the pad rubber 220 and the pressure sensor 230 are generated so that the pedal effort rapidly increases the moment the point S1 is passed, and thus, the driver may feel the operating sensitivity of the pedal pad 210 through the pedal effort difference.

The pedal pad 210 is at the full stroke at the point S1, and the pedal effort is maximized at this time.

When the driver releases the operating force at the point S2, the pedal pad 210 returns to the initial position by the spring force of the return spring 260. At this time, the hysteresis may be implemented by the spring force of the return spring 260 and the elastic force of the pad rubber 220.

As described above, in the foldable pedal apparatus according to the present disclosure, the pedal pad 210 pops up to protrude to the interior of the vehicle and be exposed toward the driver so that the pedal pad 210 may be operated by the driver in the manual driving mode in which the driver is actively involved in driving, and the pedal pad 210 is inserted into the footrest panel 10 such that exposure toward the driver is blocked so that the pedal pad 210 may not be operated by the driver in the hide state in the autonomous driving mode in which the driver is not actively involved in driving. There is the advantage that the driver may take a rest in comfort in the autonomous driving mode and, further, that safety may be improved by blocking a faulty operation of the pedal in the autonomous driving mode.

Further, the foldable pedal apparatus according to the present disclosure generates a signal relating to the pedal function by operating the pedal pad 210 by pressure through the pressure-operated pedal assembly 200 in the pop-up state, and there is the advantage of cost reduction by reducing the number of parts and downsizing through a compact configuration.

Further, in the foldable pedal apparatus according to the present disclosure, a simple configuration of the pressure-operated pedal assembly 200 and a rotating structure of the pedal housing 100 provided with the pedal pad 210 allow pop-up motion and hide motion so that the interior of the vehicle may be maximally designed by minimizing the space needed for the pop-up operation and that, in particular, there is the advantage that the high-tech image may be maximized by the configuration in which the pedal housing 100 rotates and the pedal pad 210 pops up through a small panel hole 11.

The specific embodiments of the present disclosure are illustrated and described, but it will be self-evident to those skilled in the art that the present disclosure may be improved upon and modified in various ways within the scope not departing from the technical spirit of the present disclosure provided by the patent claims below.

What is claimed is:

1. A foldable pedal apparatus for a vehicle, comprising:
    a pedal housing rotatably installed in a footrest panel;
    a pressure-operated pedal assembly provided in the pedal housing and operated by pressure to generate a signal relating to a pedal function during an operation by a driver; and
    a stopper protrusion protruding outward from the pedal housing and fixed to the pedal housing,
    wherein, when the pressure-operated pedal assembly is inserted into the footrest panel by a rotation of the pedal housing, the pressure-operated pedal assembly is in a hide state not to be operated by the driver, and when the pressure-operated pedal assembly protrudes from the footrest panel, the pressure-operated pedal assembly is in a pop-up state to be operated by the driver; and
    a position of the hide state and a position of the pop-up state are determined by the pedal housing being restrained from rotating when the stopper protrusion comes into contact with an inner surface of the footrest panel during the rotation of the pedal housing.

2. The apparatus of claim 1, further comprising
    a rotary motor fixed to the footrest panel and coupled to the pedal housing to rotate the pedal housing during operation of the rotary motor; and
    a rotation center pin connecting the footrest panel and the pedal housing to serve as a rotation center of the pedal housing.

3. The apparatus of claim 2, wherein a rotation axis connecting the rotary motor and the rotation center pin is positioned inside the footrest panel.

4. The apparatus of claim 1, wherein the pressure-operated pedal assembly includes a pedal pad protruding from one surface of the pedal housing;
    a housing cover is coupled to another surface of the pedal housing; and
    when the pedal pad is inserted into the footrest panel and the housing cover is exposed to the interior of the vehicle by the rotation of the pedal housing, the pedal pad is in the hide state not to be operated by the driver, and when the housing cover is inserted into the footrest panel and the pedal pad is exposed to the interior of the vehicle, the pedal pad is in the pop-up state to be operated by the driver.

5. The pedal apparatus of claim 4, wherein the housing cover is provided as a flat plate; and
    the flat plate-shaped housing cover forms the same plane as the footrest panel with no height difference when the housing cover is exposed to the interior of the vehicle in the hide state.

6. The pedal apparatus of claim 1, wherein the pressure-operated pedal assembly includes two assemblies spaced apart from each other in the pedal housing; and
    one of the two pressure-operated pedal assemblies is an accelerator pedal device generating a signal relating to an acceleration during an operation by the driver and the other is a brake pedal device generating a signal relating to braking.

7. The pedal apparatus of claim 6, wherein the brake pedal device is larger than the accelerator pedal device.

8. The pedal apparatus of claim 1, wherein the pressure-operated pedal assembly includes:
- a pedal pad protruding from one surface of the pedal housing to be operated by the driver;
- a pad rubber coupled to the pedal pad;
- a pressure sensor fixed to the pedal housing to generate an electrical signal upon coming into contact with the pad rubber by an operation of the pedal pad; and
- a printed circuit board (PCB) fixed to the pedal housing to receive a signal from the pressure sensor and generate the signal relating to the pedal function.

9. The pedal apparatus of claim 8, wherein the pressure-operated pedal assembly further includes:
- a support bulkhead fixed to the pedal housing to support the PCB; and
- a return spring supported at opposed ends by the pedal pad and the support bulkhead through the pad rubber, the pressure sensor, and the PCB.

10. The pedal apparatus of claim 8, wherein the pressure-operated pedal assembly further includes a pad guide coupled to the pedal pad and wrapped around a perimeter of the pad rubber to maintain a shape of the pad rubber.

11. The pedal apparatus of claim 10, wherein the pad rubber includes an overlap portion overlapping the pad guide and a non-overlap portion not overlapping the pad guide in an operation direction of the pedal pad, and
- an operating sensitivity of the pedal pad is tuned by adjusting a ratio between the overlap portion and the non-overlap portion.

12. The pedal apparatus of claim 8, wherein an air gap of a predetermined width is provided between the pad rubber and the pressure sensor in a state in which the driver does not operate the pedal pad.

13. The pedal apparatus of claim 8, wherein the pressure-operated pedal assembly includes two assemblies including an accelerator pedal device and a brake pedal device, and
- each of the accelerator and brake pedal devices includes a respective pedal pad, pad rubber, pressure sensor, and printed circuit board (PCB).

14. The pedal apparatus of claim 8, wherein a surface of the pedal pad has an arc shape, and
- a surface arc of the pedal pad has a radius the same as, or smaller than, a rotational arc of the pedal housing.

15. A foldable pedal apparatus for a vehicle, comprising:
a pedal housing rotatably installed in a footrest panel; and
a pressure-operated pedal assembly provided in the pedal housing and operated by pressure to generate a signal relating to a pedal function during an operation by a driver,
wherein, when the pressure-operated pedal assembly is inserted into the footrest panel by a rotation of the pedal housing, the pressure-operated pedal assembly is in a hide state not to be operated by the driver, and when the pressure-operated pedal assembly protrudes from the footrest panel, the pressure-operated pedal assembly is in a pop-up state to be operated by the driver;
the pressure-operated pedal assembly includes a pedal pad protruding from one surface of the pedal housing;
a housing cover is coupled to another surface of the pedal housing;
when the pedal pad is inserted into the footrest panel and the housing cover is exposed to the interior of the vehicle by the rotation of the pedal housing, the pedal pad is in the hide state not to be operated by the driver, and when the housing cover is inserted into the footrest panel and the pedal pad is exposed to the interior of the vehicle, the pedal pad is in the pop-up state to be operated by the driver.

16. A foldable pedal apparatus for a vehicle, comprising:
a pedal housing rotatably installed in a footrest panel; and
a pressure-operated pedal assembly provided in the pedal housing and operated by pressure to generate a signal relating to a pedal function during an operation by a driver,
wherein, when the pressure-operated pedal assembly is inserted into the footrest panel by a rotation of the pedal housing, the pressure-operated pedal assembly is in a hide state not to be operated by the driver, and when the pressure-operated pedal assembly protrudes from the footrest panel, the pressure-operated pedal assembly is in a pop-up state to be operated by the driver; and
the pressure-operated pedal assembly includes:
- a pedal pad protruding from one surface of the pedal housing to be operated by the driver;
- a pad rubber coupled to the pedal pad;
- a pressure sensor fixed to the pedal housing to generate an electrical signal upon coming into contact with the pad rubber by an operation of the pedal pad; and
- a printed circuit board (PCB) fixed to the pedal housing to receive a signal from the pressure sensor and generate the signal relating to the pedal function.

\* \* \* \* \*